April 17, 1956     A. W. GAUBATZ     2,741,919

COMPRESSOR TEMPERATURE SENSING DEVICE

Filed Jan. 14, 1952

INVENTOR.
Arthur W. Gaubatz
BY Willits, Helmig & Baillio
ATTORNEYS

United States Patent Office 2,741,919
Patented Apr. 17, 1956

2,741,919

COMPRESSOR TEMPERATURE SENSING DEVICE

Arthur W. Gaubatz, Indianapolis, Ind., assignor to General Motors Corporation, Detroit, Mich., a corporation of Delaware Application January 14, 1952, Serial No. 266,425

3 Claims. (Cl. 73—343)

My invention relates to temperature sensing devices, and, more particularly, to an improved temperature sensing device for measuring temperatures within elastic fluid dynamic machines such as gas turbine engines and the like.

For fuel control and other allied purposes, it is essential, particularly in aircraft jet engine installations, to measure the temperature of the air entering the engine. It has been customary practice to measure the temperature of the air entering the compressor of a jet propulsion engine by locating temperature sensing devices in the compressor inlet. However, this has been found unsatisfactory due to icing conditions which prevent proper response to air temperature. Owing to the complexity of the compressor structure and the limited space available therein, it has been found difficult to locate temperature sensing elements within the compressor where the temperature is beyond the icing zone.

Accordingly, my invention has for its general object to provide an improved temperature sensing device for measuring the temperature of the air flowing through the compressor of a jet propulsion engine, and, more particularly, to provide such a device without disturbing or interfering with the air flow through the engine. Other objects are to provide a simple and efficient temperature sensing device that is light in weight and sensitive and efficient in operation.

Figure 1:
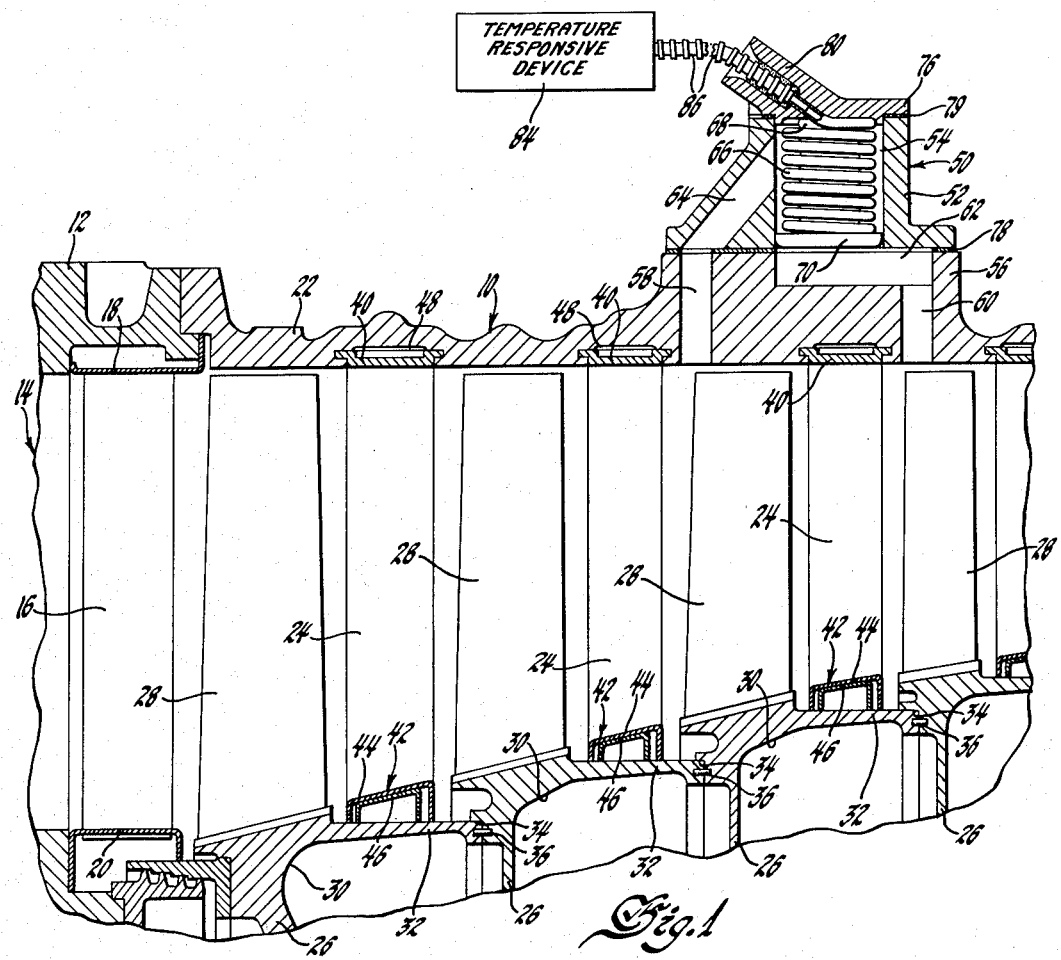
Figure 2:
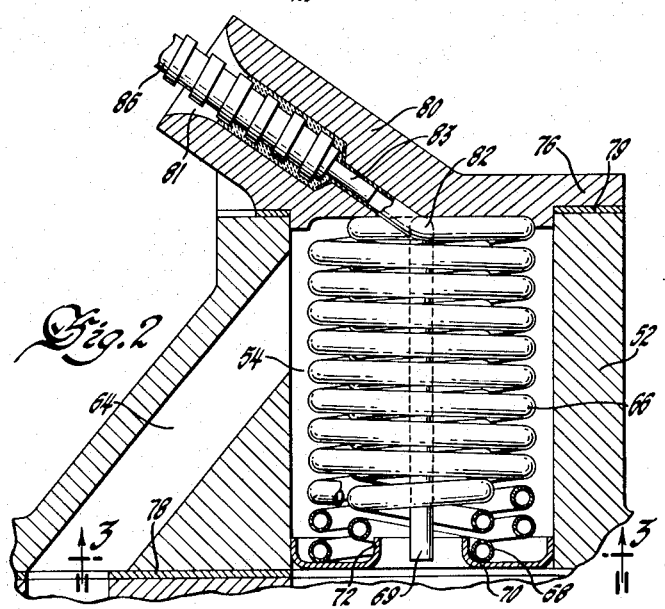
Figure 3:
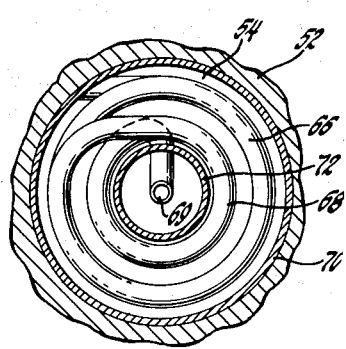

The preferred manner in which these and other objects of the invention are realized, together with the features and advantages attending the invention, will appear from the following detailed description and drawings, wherein: Figure 1 is a fragmentary sectional view taken in the plane of the axis of a multistage axial flow compressor employing temperature sensing means in accordance with the preferred embodiment of the present invention; Figure 2 is an enlarged fragmentary sectional view of the temperature sensing means of Figure 1; and Figure 3 is a fragmentary sectional view taken in the plane 3—3 of Figure 2.

Referring to the drawings, Figure 1 is a partial longitudinal view of a multistage axial flow compressor 10 fitted to the forward frame 12 of a gas turbine jet engine. Only a portion of the forward frame and compressor are shown, the remainder of the engine being omitted in the interest of clarity of the drawings and conciseness of the specification, as the general structure of such engines is well known to those skilled in the art.

The forward frame 12 defines an annular passage 14 therein which serves as the inlet to the compressor. A row of inlet guide vanes 16 is mounted between outer and inner shroud rings 18 and 20 suitably secured to the discharge end of the forward frame. The compressor 10 comprises a split cylindrical casing 22 which mounts a number of rows of stator vanes 24 and encloses a rotor member defined by a number of axially spaced rotor disks 26 each having a plurality of rotor blades 28 mounted about the periphery thereof.

The rotor disks 26, which are mounted for rotation in known manner on stub shafts (not shown) journaled within the compressor casing, are each constituted by a thickened rim portion 30 and a spacing finger 32 integrally formed therewith and extending rearwardly therefrom to engage a mating shoulder 34 formed in the forward end of the rim of a succeeding rotor disk. The rotor disks are coupled by a number of short dowel pins 36 extending between the edge of the spacing ring of one disk and the forward edge of the rim of a succeeding disk.

The stator vanes 24 of each stator stage are mounted in a split annular assembly which is supported from the compressor casing 22 and is composed of a pair of semi-cylindrical segments corresponding to the halves of the compressor casing. Each of the segments comprises an outer shroud band 40 and a double-channel inner shroud band 42, the latter comprising arcuate outer and inner channel members 44 and 46 having superimposed webs and inwardly extending flanges projecting in close proximity with the spacing ring 32 of a corresponding rotor disk for sealing purposes. The outer shroud band 40 is mounted in a grooved recess 48 extending about the interior of the compressor casing.

In accordance with the preferred embodiment of my invention, the temperature of the air entering the compressor is measured by circulating a small quantity of air bled from the compressor through a temperature bulb device 50 which is located without the compressor casing 22. The temperature bulb device is shown located in the vicinity of the third stator stage but may be associated with any one of the early stages of the compressor where the temperature is above the icing zone and is related to the temperature at the compressor inlet by a simple fraction. Of course, temperature may be measured at any desired point in the engine by my device.

The temperature bulb is contained in a housing 52 which has a cylindrical bore 54 extending therethrough. The housing is mounted on a boss or pad 56 formed on the exterior of the compressor casing through which extend two ports or passages 58 and 60 spaced ahead of and behind the vanes of the stator stage with which the bulb is associated. A recess 62, which is aligned with the bore 54 of the housing 52, is provided in the surface of the boss 56 so as to direct the air bled from the compressor casing through the rearward port 60 into the interior of the housing 52. The air from the compressor is circulated by the pressure difference across the stage through the housing 52 over the exterior of the coiled temperature bulb and returned to the compressor through a passage 64 in the housing 52 which extends between the cavity 54 and the forward port 58.

As best shown in Figure 2, the temperature bulb is a continuous double helical coil formed from a thin-walled tube of material of high heat conductivity such as copper, for example, and comprises an outer portion 66 coiled about an inner portion 68 substantially concentric therewith and extending upward through the center thereof. The end of the tube continues from the upper end of the inner coil and is bent down to extend through the interior of the coil so that the end 69 (Figures 2 and 3) of the tube is accessible for evacuation, filing with fluid, and pinching off and sealing as explained hereinafter. The inner end of the coiled temperature bulb is seated in a flanged ring 70 which is fitted in the housing 52 and serves as a support for the inner end of the bulb. The ring 70 has a hub-like projection 72 formed in the open central portion thereof which projection serves to locate the bulb and to prevent displacement of the inner coil.

A head 76 is secured to the end of the housing 52 remote from the compressor casing and may be fastened thereto by cap screws (not shown). Gaskets 78 and 79 between the compressor casing 22 and housing 52 and the housing 52 and head 76, respectively, are provided for sealing purposes. The head has a cylindrical extension 80 integral therewith which contains a passage 81 therethrough. As best shown in Figure 2, the inner end of the passage 81 is of lesser diameter than its outer end and receives the free end 82 of the coiled tube which is inserted therein, the end of the tube then being flared in the neck of the passage so as to prevent the tube from slipping out thereof.

The coiled tube is connected to a conventional temperature responsive device 84 through a length of flexible armored tubing 86 (Figure 1), the end of which adjacent the bulb is inserted into the extension 80 in the head 76 over the end of a capillary tube 83 that is fitted in and extends from the free end 82 of the tube as shown in Figure 2. The system is then evacuated and the coiled bulb filled with a thermosensitive medium such as a volatile fluid which is introduced through the lower end 69 of the coiled tube. The lower end of the tube is then pinched or otherwise sealed and its opposite end 82 soldered to the capillary tube 83 and the end of the flexible tubing 86.

Depending upon the particular application, the temperature device may be any conventional apparatus such, for example, as a pressure gauge calibrated in terms of temperature or a bellows-actuated valve forming a part of an automatic fuel control system, as is known to those skilled in the art.

As embodied in a compressor, the invention advantageously utilizes the pressure differential between two points therein to provide for circulation of air through the temperature bulb housing. In other installations where the subject temperature bulb is employed to measure the temperature of fluid flowing through a conduit, the circulation of a small quantity of fluid over the coiled temperature bulb may be effected by appropriate conformation of the inlet and outlet ports in the housing of the bulb so as to utilize the velocity of the fluid flowing through the conduit.

The invention thus advantageously affords a ready measurement of the temperature within the compressor without disrupting the air flow therethrough, since the temperature bulb is located without the compressor casing and is not disposed in the flow path. This feature also permits the use of a thinner-walled material for the tubing than could be employed were the temperature sensing device placed directly in the main air stream where it would be subjected to the buffeting action of the stream thereon. The utilization of thinner-walled tubing thus improves the heat transfer and thermal response characteristics of the bulb. By locating the temperature sensing element in one of the early stages of the compressor beyond the icing zone, the adverse effects of icing also are eliminated.

Although the invention has been shown embodied in the compressor of a gas turbine engine, this embodiment is but illustrative of the application of the principles of the invention. Numerous other arrangements and applications thereof will appear to those skilled in the art within the spirit and scope of the invention.

I claim:

1. In an axial flow compressor having a stator casing and a rotor mounted in said casing, said stator casing and said rotor including a plurality of axially spaced rows of stator vanes and rotor blades constituting successive higher pressure stages in said compressor, means for obtaining a measure of the temperature of air in said compressor comprising means defining ports in said casing at axially spaced points of different pressure away from the inlet of said compressor where the temperature is above the icing range, a housing mounted on said casing and having a bore therein, a temperature sensing means within said bore of said housing, and means connecting said bore with said ports, whereby a portion of the air within said casing is re-circulated and caused to pass over said temperature sensing means.

2. In an axial flow compressor having a stator casing and a rotor mounted in said casing, said stator casing and said rotor including a plurality of axially spaced rows of stator vanes and rotor blades constituting successive higher pressure stages in said compressor, means for obtaining a measure of the temperature of air in said compressor comprising a pair of ports in said stator casing spaced ahead of and behind one of said stator vanes, a housing having a bore therein mounted on said stator casing, a temperature sensing means within said bore of said housing, and means connecting said bore with said ports whereby a re-circulating passage is provided extending across a compressor stator and rotor stage with said temperature sensing means in the path of the air circulating through said re-circulating passage.

3. In an axial flow compressor having a stator casing and a rotor mounted in said casing, said stator casing and said rotor including a plurality of axially spaced rows of stator vanes and rotor blades constituting successive higher pressure stages in said compressor, means for obtaining a measure of the temperature of air in said compressor comprising a pair of radially extending ports in said stator casing spaced ahead of and behind one of said stator vanes, a housing having a cylindrical bore therein mounted on said stator casing, a temperature sensing means within said bore of said housing, and means connecting said bore with said ports whereby a re-circulating passage is provided extending across a compressor stator and rotor stage with said temperature sensing means in the path of the air circulating through said re-circulating passage.

References Cited in the file of this patent

UNITED STATES PATENTS

| Number | Name | Date |
| --- | --- | --- |
| 1,246,656 | Potter | Nov. 13, 1917 |
| 1,583,097 | Potter | May 4, 1926 |
| 1,834,452 | Frey et al. | Dec. 1, 1931 |
| 1,985,929 | Jorgensen | Jan. 1, 1935 |
| 2,086,129 | Hamilton | July 6, 1937 |
| 2,164,882 | Miles | July 4, 1939 |
| 2,262,496 | Hobbs | Nov. 11, 1941 |
| 2,337,484 | McCollum | Dec. 21, 1943 |
| 2,405,768 | Stalker | Aug. 13, 1946 |

FOREIGN PATENTS

| Number | Country | Date |
| --- | --- | --- |
| 504,214 | Great Britain | Apr. 21, 1939 |